United States Patent
Wiswell et al.

(10) Patent No.: US 9,280,776 B2
(45) Date of Patent: Mar. 8, 2016

(54) DELIVERING CONTENT BASED ON PHYSICAL OBJECT CHARACTERISTICS

(75) Inventors: Christian N. Wiswell, Seattle, WA (US); Dana L. Silverstein, Duvall, WA (US); Derek Sunday, Renton, WA (US); Anne Marie Piper, Emeryville, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1689 days.

(21) Appl. No.: 11/620,554

(22) Filed: Jan. 5, 2007

(65) Prior Publication Data
US 2008/0167913 A1 Jul. 10, 2008

(51) Int. Cl.
G06Q 30/00 (2012.01)
G06Q 30/02 (2012.01)
G06F 17/30 (2006.01)
G06Q 20/10 (2012.01)

(52) U.S. Cl.
CPC .......... *G06Q 30/02* (2013.01); *G06F 17/30867* (2013.01); *G06Q 20/102* (2013.01); *G06Q 30/0256* (2013.01); *G06Q 30/0273* (2013.01)

(58) Field of Classification Search
CPC .................. G06Q 30/0257; G06Q 30/0251
USPC .............. 705/14.55, 14.49; 235/435; 345/173
See application file for complete search history.

(56) References Cited

U.S. PATENT DOCUMENTS

| 6,145,741 A | 11/2000 | Wisdom et al. |
| 6,422,462 B1 | 7/2002 | Cohen |
| 6,571,279 B1 * | 5/2003 | Herz et al. .................... 709/217 |
| 7,036,725 B2 | 5/2006 | Blaeuer |
| 7,055,740 B1 | 6/2006 | Schultz et al. |

(Continued)

FOREIGN PATENT DOCUMENTS

| EP | 0991006 A2 | 4/2000 |
| EP | 1098279 A2 | 5/2001 |

(Continued)

OTHER PUBLICATIONS

Rekimoto, Jun et al, "Cybercode: Designing Augmented Reality Environments with Visual Tags", Designing Augmented Reality Environments (DARE), Apr. 2000.*

(Continued)

*Primary Examiner* — Michael Bekerman
(74) *Attorney, Agent, or Firm* — Jeremy Snodgrass; Doug Barker; Micky Minhas

(57) ABSTRACT

The present invention extends to methods, systems, and computer program products for delivering content based on physical object characteristics. When a physical object is detected within a specified proximity of a component of a computer system, the computer system submits an accessed object identifier for the physical object to a content portal. The content portal identifies content and corresponding layout information for the computer system by at least determining the commonality between object keywords for the physical object and target keywords for content providers and determining content placement priorities corresponding to content providers. The content portal sends the content and layout information to the computer system. The computer system filters a subset of content from the received and presents the filtered subset of content on a presentation surface in accordance with corresponding layout information.

16 Claims, 5 Drawing Sheets

(56) References Cited

U.S. PATENT DOCUMENTS

| | | | |
|---|---|---|---|
| 7,099,568 | B2 | 8/2006 | Ochiai et al. |
| 7,103,573 | B2 | 9/2006 | Mobed et al. |
| 2001/0001856 | A1 | 5/2001 | Gould et al. |
| 2002/0055880 | A1* | 5/2002 | Unold et al. ................. 705/26 |
| 2002/0077170 | A1 | 6/2002 | Johnson et al. |
| 2002/0112096 | A1 | 8/2002 | Kaminsky et al. |
| 2002/0153424 | A1 | 10/2002 | Li |
| 2003/0018541 | A1 | 1/2003 | Nohr |
| 2003/0024975 | A1 | 2/2003 | Rajasekharan |
| 2003/0066073 | A1 | 4/2003 | Rebh |
| 2004/0019523 | A1* | 1/2004 | Barry et al. .................. 705/14 |
| 2004/0044574 | A1 | 3/2004 | Cochran et al. |
| 2004/0103028 | A1 | 5/2004 | Littman et al. |
| 2005/0022114 | A1 | 1/2005 | Shanahan et al. |
| 2005/0154644 | A1 | 7/2005 | Deakin et al. |
| 2005/0218214 | A1 | 10/2005 | Gravelle et al. |
| 2006/0157556 | A1 | 7/2006 | Halbur et al. |
| 2006/0178024 | A1 | 8/2006 | Overhultz et al. |
| 2006/0230192 | A1* | 10/2006 | Parry et al. .................. 710/15 |
| 2006/0267952 | A1 | 11/2006 | Alcorn |
| 2007/0150353 | A1* | 6/2007 | Krassner et al. ............. 705/14 |

FOREIGN PATENT DOCUMENTS

| | | |
|---|---|---|
| EP | 1708148 | 10/2005 |
| JP | 2001160071 | 6/2001 |
| JP | 2002280982 | 9/2002 |
| JP | 2003122766 | 4/2003 |
| JP | 2005-045605 A | 2/2005 |
| JP | 2005156591 | 6/2005 |
| WO | WO 93/16443 A1 | 8/1993 |
| WO | WO 00/77722 A1 | 12/2000 |
| WO | WO2006018636 | 2/2006 |
| WO | 2006127128 A2 | 11/2006 |

OTHER PUBLICATIONS

Valkkynen, Pasi, et al., "A user interaction paradigm for physical browsing and near-object control based on tags", http://virtual.vtt.fi/inf/julkaisut/muut/2003/paradigm_browsing.pdf.

Eurpoean Broadcasting Union, "EBU preliminary views on regulatory aspects of new advertising techniques", http://www.ebu.ch/CMSimages/en/leg_pp_new_advertising_techniques_061102_tcm6-4436.pdf.

Bacquet, Sylvain, et al., "PEACPocket : a technological demonstrator for future multimedia smart card", ACM International Conference Proceeding Series; vol. 121, 2005, pp. 297-302.

INCARD Technologies, Cutting edge security behind every purchase you make, http://www.incardtech.com/products.htm.

Aveso Printed Electronic Displays Enable a Range of End Applications, Contactless Payment Card, 2005 Aveso Inc.

Office Action received in Canadian Patent Application No. 2,674,242, Mailed Date: Jul. 30, 2014, Filed Date: Jun. 30, 2009, 2 pages.

"Office Action Issued in Korea Republic of (KR) Patent Application No. 10-2009-7014015", Mailed Date: Feb. 26, 2016, 7 Pages.

"Office Action Issued in Korea Republic of (KR) Patent Application No. 10-2009-7014015", Mailed Date: Aug. 21, 2014, 10 Pages.

"Office Action issued in Canadian Patent Application No. 2,674,242", Mailed Date: Mar. 27, 2015, 4 Pages.

"Office Action Issued in Canadian Patent Application No. 2674242", Mailed Date: Nov. 18, 2015, 4 pages.

* cited by examiner

DELIVERING CONTENT BASED ON PHYSICAL OBJECT CHARACTERISTICS

CROSS-REFERENCE TO RELATED APPLICATIONS

Not Applicable.

BACKGROUND

Background and Relevant Art

Computer systems and related technology affect many aspects of daily life in society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computers have become more interconnected, advertisers have attempted to use computer networks to advertise to potential customers. For example, when accessing content on the Internet, it is not uncommon to have advertisements presented along with the content. Further, as conventional advertising mediums become more computerized and network connectable, traditional advertising methods have been adapted for transmission via computer networks.

Accordingly, preferred methods of advertising have been to transmit an advertisement to a large audience via mass media such as newspapers, magazines, radio, television, the Internet, etc. This mass media advertising strategy seeks to reach the most number of recipients to increase the odds of contacting the ones most likely to purchase the advertised product or service. Although a large recipient audience may see the advertisement, advertisers understand that only a small percentage of those recipients has a real interest in purchasing the advertised product or service.

To some extent, advertisers can increase the probability of reaching purchasing consumers by creating advertisements that appeal to those potential consumers and broadcasting the advertisements in media that those same consumers are most likely to view. However, even using a popular medium to a typical potential consumer, advertisers will exclude potential consumers that do not use the medium (under inclusion) and will include viewers of that medium who have no desire to purchase the product or service (over inclusion). Because of this under inclusion and over inclusion, advertisers necessarily waste at least a portion of their budgets on consumers who are not in the market to buy their product or service.

To offset this unnecessary spending, advertisers continually strive to narrow advertising efforts to a targeted purchasing audience. At least one targeting method distributes advertisements in media content that attract demographic groups likely to purchase the advertised product or service. For example, television shows often appeal to a particular type of audience, marked perhaps by age, income, or education. Usually, the specific sponsors of the shows sell products that appeal to the same particular audience.

In at least one other targeting method, advertisers pay a mass media to deliver advertisements as a part of the media content. This method embeds the advertisement in the media content such that the viewer must view the advertisement to view the media content. For example, some television programs incorporate advertising pitches into the program commentary or discussions. Other targeting techniques display advertisements concurrently with the media content, such as with corporate sponsored scoreboard icons in the corner of a television or computer screen, that are repeatedly shown during a sports event broadcast.

Although the targeting techniques described above focus on a smaller consumer audience, the over inclusion and under inclusion inherent in mass media advertising remain their principal drawbacks. In each targeting strategy, advertisers may still waste money by reaching people who are not interested in the product or service or by excluding those people who are interested. Because these techniques assess consumer interest on the larger scale of program audiences instead of on an individual viewer basis, the techniques typically always suffer from the squandered advertising dollars associated with over inclusion and under inclusion.

More specifically, with respect to television advertising, the emergence of Digital Video Recorders ("DVRs") and Internet Protocol Television ("IPTV") allow viewers to easily fast forward or otherwise skip advertisements in television content. Thus, at least to some extent, television advertisements have become optional for viewers, thereby further decreasing the value of traditional television spot advertising. This gives the viewer more power to view and demand advertisements on their own terms, which may mean no advertisements at all.

Thus, recognizing the drawbacks to mass media, advertisers have turned to the Internet to isolate potential consumers and increase the power of their advertising dollars. On the Internet, a user controls viewed content by navigating the World Wide Web and accessing Web pages and Web advertisements. Using software, advertisers can intelligently monitor these user viewing selections, analyze viewing patterns, and deliver advertisements suiting the tastes and interests of the user. For example, if a user has repeatedly chosen to view internet advertisements for camping equipment, the software will retrieve all camping equipment advertisements that subscribe to the advertising plan and deliver them to the user. In addition, the software can retrieve advertisements for related products, such as hiking gear, and display those advertisements to the user as well.

However, targeted Internet advertising typically has limited data from which to determine a customer profile. To collect data, the targeted Internet advertising systems simply record user selections of Internet advertisements, note words typed when searching Web content, or read user information such as geographic location, domain type (e.g., commercial, education or government), and perhaps standard industry codes (SICs), which indicate such user characteristics as employer and type of employer. To target the advertising, the Internet systems tend to deliver advertisements, e.g., banner advertisements, related to a user's previous advertisement selections or search terms without regard to the current and changing tastes of the user.

BRIEF SUMMARY

The present invention extends to methods, systems, and computer program products for delivering content based on physical object characteristics. A computer system detects that a physical object is at least within a specified proximity of (and potentially in physical contact with) a component (e.g., a presentation surface) of the computer system. The computer system accesses an object identifier corresponding to the detected physical object. The computer system submits at least the accessed object identifier to a content portal.

The content portal receives at least the accessed object identifier from the computer system. The content portal accesses object keywords corresponding to the received object identifier. The content portal identifies appropriate content and corresponding layout information to return to the computer system in response to receiving the object identifier. Identification of appropriate content and corresponding layout information can include at least one of: determining the commonality between the accessed target keywords and object keywords received from content providers and determining content placement priorities corresponding to content providers.

The content portal sends the identified appropriate content and corresponding layout information to the computer system for presentation on the presentation surface of the computer system. The computer system receives the content and corresponding layout information. The computer system filters a subset of content from the received content for presentation on the presentation surface. The filtered subset of content satisfies content filter conditions at the computer system. The computer system presents the filtered subset of content on the presentation surface in accordance with the corresponding layout information.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
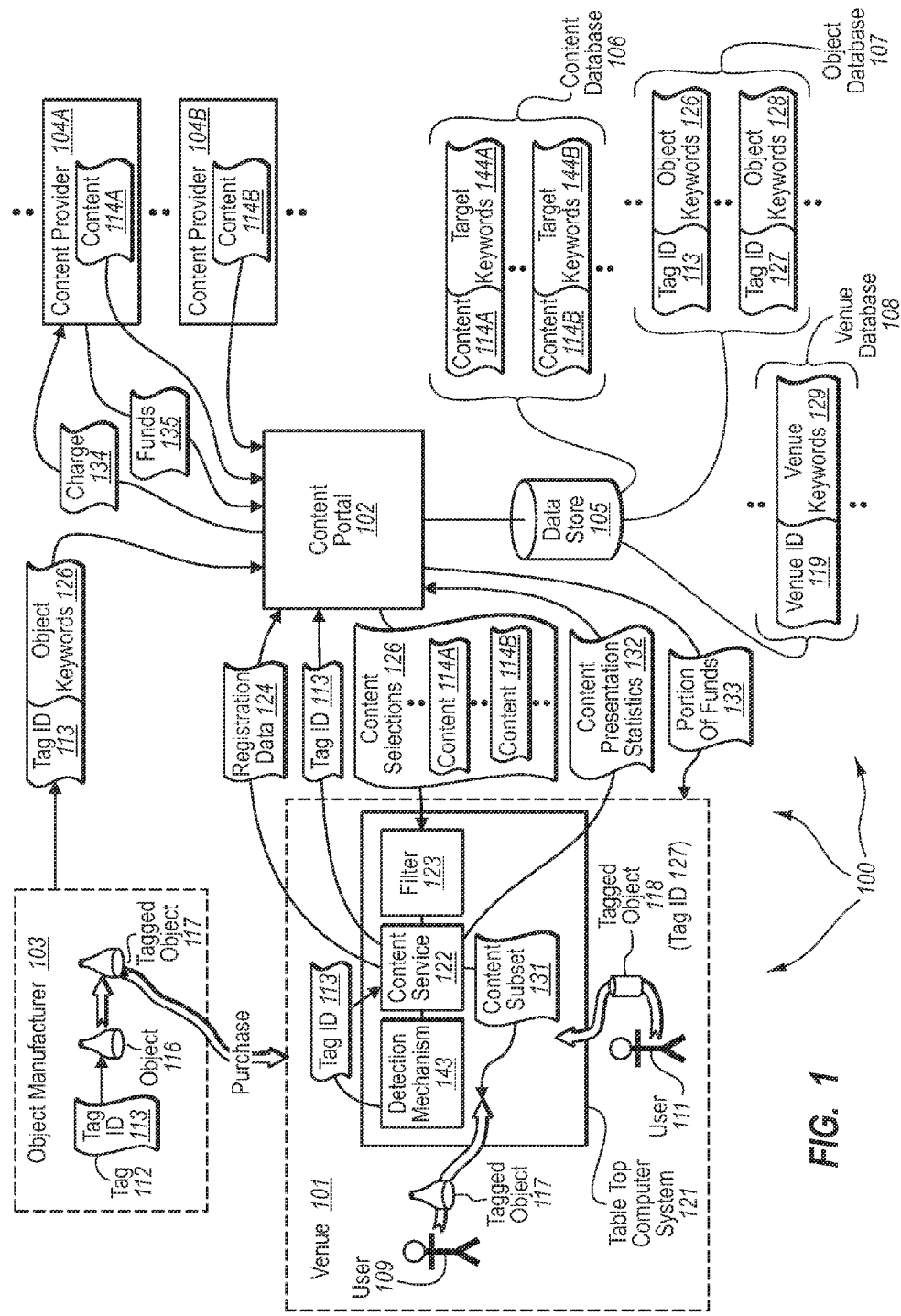
FIG. 1 illustrates an example computer architecture that facilitates delivering content based on physical object characteristics.

The present invention extends to methods, systems, and computer program products for delivering content based on physical object characteristics. A computer system detects that a physical object is at least within a specified proximity of (and potentially in physical contact with) a component (e.g., a presentation surface) of the computer system. The computer system accesses an object identifier corresponding to the detected physical object. The computer system submits at least the accessed object identifier to a content portal.

The content portal receives at least the accessed object identifier from the computer system. The content portal accesses object keywords corresponding to the received object identifier. The content portal identifies appropriate content and corresponding layout information to return to the computer system in response to receiving the object identifier. Identification of appropriate content and corresponding layout information can include at least one of: determining the commonality between the accessed target keywords and object keywords received from content providers and determining content placement priorities corresponding to content providers.

The content portal sends the identified appropriate content and corresponding layout information to the computer system for presentation on the presentation surface. The computer system receives the content and corresponding layout information. The computer system filters a subset of content from the received content for presentation on the presentation surface. The filtered subset of content satisfies content filter conditions at the computer system. The computer system presents the filtered subset of content on the presentation surface in accordance with the corresponding layout information.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, table top computers, multi-processor systems, microprocessor-based or programmable consumer electronics, network PCs, minicomputers, mainframe computers, mobile telephones, PDAs, pagers, game console/unit and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates delivering content (e.g., advertisements, games, multi-media clips, etc.) based on physical object characteristics. Depicted in computer architecture 100 are various components including venue 101, table top computer system 121, object manufacturer 103, content portal 102, and content providers 104A and 104B. Each of the various components can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, venue 101 can be any private, semi-private, or public location, such as, for example, a restaurant, a bar, a club, an airport, a theater, a home, a lobby, an office, etc., where a user can interact with a computer. As depicted, venue 101 includes table top computer system 121 and users 109 and 111. In environments, where venue 101 is a semi-public or public location, such as, a restaurant or a club, users 109 and 111 can be patrons. Table top computer system 121 can have the physical characteristics of a table, with a presentation surface configured to present content on the table top such that when a user (or patron) looks at the table top they can view presented content.

Generally, table top computer system 121 is configured to present content related to a physical object in response to detection of the physical object. Table top computer system 121 can register with a content portal to receive content related to detected physical objects. Registration can include submitting registration information, such as, for example, venue type, geographic location, venue services, target audience age, etc, to the content portal. The content portal can retain the registration information (e.g., as venue keywords) and associate the registration information with a venue identifier. The venue identifier can then be used by the content portal to tailor content for venue 101.

Table top computer system 121 includes detection mechanism 143, content service 122, and filter 123. Detection mechanism 143 can be configured to detect when a physical object (e.g., a bottle, a glass, a finger, a hat, etc.) is at least within a specified proximity of a component of table top computer system 121. Detection mechanism can also be configured to detect when a physical object has come into physical contact with a portion of the presentation surface of the computer system.

Detection mechanism 143 can interoperate with sensors included in and/or external to the components of table top computer system 121 to detect a physical object. For example, detection mechanism 143 can interoperate with cameras, infrared sensors, bar code scanners, wireless communication modules, etc., physically located in an area surrounding (e.g., the same room with) table top computer system 121. Additionally, the presentation surface of table top computer system 121 can include (e.g., embedded) sensors, such as, for example, pressure sensors, temperature sensors, image scanners, barcode scanners, etc. Sensors can be included (e.g., embedded) in a plurality of locations across the presentation surface of table top computer system 121. In some embodiments, the presentation surface includes sensors for implementing a touch screen interface. For example, the presentation surface can include an interactive multi-touch surface.

Detection mechanism can interoperate with any of the described sensors to determine when an object is within a specified proximity of a component (e.g., a presentation surface) of table top computer system 121 or in physical contact with a presentation surface of table top computer system 121. A specified proximity can be a specified number of inches or feet from table top computer system 121 or that a physical object is in the same room as table top computer system 121. For example, a physical object can be detected "hovering" above the presentation surface of table top computer system when it is relatively close to the presentation surface (but not necessarily in physical contact with the presentation surface).

Detection mechanism 143 can also be configured to interoperate with sensors individually or as subsets such that detection mechanism 143 can differentiate locations where physical contact with the presentation surface has occurred. Thus, detection mechanism 143 can differentiate between contact at a plurality of different locations on the presentation surface of table top computer system 121 simultaneously.

Detection mechanism 143 can also be configured to determine the type of a physical object that is within a specified proximity to a component of table top compute system or that has physically contacted the presentation surface of table top computer system 121. Detection mechanism 143 can interoperate with the sensors included (e.g., embedded) in the presentation surface of table top computer system 121 and potentially other sensors (e.g., wireless communication modules) of table top computer system 121 to determine a physical object type. For example, in response to one or more embedded pressure sensors detecting physical contact with a portion of the presentation surface, a Radio Frequency ("RF") scanner can then scan for RF tags attached to a contacting physical object. Thus, one sensor or subset of sensors can be used to detect physical contact with an object and another sensor or subset of sensors can be used to determine the type of the object that caused the contact.

In another detection example, after pressure sensors detect contact, an image scanner can be used to scan the physical characteristics at and/or around the location of the physical contact. From the scanned data, detection mechanism 143 can determine the type of the physical object. For example, if a bottle is placed on (or is detected "hovering" above) the presentation surface, a scanner can scan the bottom of the bottle (e.g., the portion in contact with the presentation surface) to generate scan data. The scanner can then send the scan data to detection mechanism 143. From the scan data, detection mechanism 143 can determine (e.g., using shape recognition) that the bottle is a bottle for a particular brand of soft drink. Detection mechanism 143 can have access to previously scanned images (e.g., including product logos, product dimensions, etc.) to facilitate object type determinations.

From an identified object type, detection mechanism 143 can access an object identifier corresponding to a detected physical object. The object identifier can be read from a tag attached to the physical object. For example, when a physical object includes an attached RF tag, the object identifier can be read by an RF scanner directly from the RF tag. Alternately, subsequent to object type determination, the object identifier can be accessed from a storage location that lists object types and corresponding object identifiers. In even other embodiments, an object identifier is temporarily assigned to an object for the duration of the object being present within the specified proximity (e.g., in physical contact with). If the object is subsequent moved outside of the specified proximity and then back into the specific proximity, the object may be assigned a different object identifier.

Object typing can be performed with varied levels of specificity. For example, detection mechanism 143 may identify a less specific category of object, such as, for example, a generic coffee cup. On the other hand, detection mechanism 143 may identify a more specific category of object, such as, for example, a bottle for a specific brand of soda. The specificity of object categories is user configurable and can vary by venue for different types of objects. For example, a bar may detect bottles by brand but detect coffee cups generally as coffee cups.

Content service 122 is configured to request content from a content portal based on the received object identifier. Content service 122 can send content requests that include one or more object identifiers, a venue identifier, an electronic address, or other portions of data, which can be used by a content portal to identify appropriate content for presentation at table computer system 121. Content service 122 is also configured to present content the display surface of table top computer system 121. Content can be presented in accordance with received and/or generated layout information.

Layout information can include content position, size, shape, form, orientation, and duration. In some embodiments, layout information for presenting content is received along with the content from a content portal. For example, when a bottle of a specific brand of soft drink is detected, content related to the brand can be presented in proximity to where the bottle is physically contacting the presentation surface. Layout information can be used to control how different content related to different physical objects is simultaneously presented on different portions of the presentation surface (e.g., when multiple users are sitting at a table).

Filter 123 is configured to filter content received from a content portal. Filter 123 can filter received content based on venue specific criteria to more appropriately tailor receive content for users (patrons) that use computer systems within venue 101. For example, competitors in the same industry may chose to block one another's content. Filter 123 can include one or more reject filters (of varied specificity) to block content the venue does not want to allow. Alternately to or in combination with one or more reject filters, filter 123 can include one or more accept filters (of varied specificity) to accept content the venue does want to allow. Filter 123 can also include default behavior for accepting and/or rejection content when a reject or accept filter is not expressly configured for the content.

In some embodiments, a venue owner associates an object identifier with a physical object. The venue owner then registers the object identifier with the content portal. To register the object identifier, the venue owner can transmit the object identifier and relevant object keywords to the content portal. The content portal can then store the association of the object identifier and relevant object keywords to provide content tailored for object.

In other embodiments, an object manufacturer associates an object identify with a physical object during manufacturer. The manufacturer then registers the object identifier with the content portal. The content portal can then store the association of the object identifier and relevant object keywords to provide content tailored for object. For example, object manufacturer 103 can attach tag 112 (e.g., an RF tag) to object 116 resulting in tagged object 117. Tag 112 can store tag ID 113 in a format that is accessible to the sensors (e.g., an RF scanner) of table top computer system 121. A specified tag ID can serve a specific brand, model, or type of object with duplicates of tags with the specified tag ID attached to multiple instances of the same product (e.g., to each can of a brand of software). Tagging mechanisms can include barcodes, unique product identifiers (e.g., graphic, serial number, etc.), and RF tagging.

Object manufacturer 103 can then submit tag ID 113 and corresponding object keywords 126 to content portal 121. Subsequently, venue 101 can purchase tagged object 117. Thus, in these other embodiments, venue 101 is relieved from having to create and maintain object identifiers.

Generally, content portal 102 is configured to manage the delivery of content to a computer system in response to receiving identifying information requesting that content be delivered to the computer system (e.g., in response to detecting a physical object). Content portal 102 stores content and data for identifying appropriate content in data store 105. Content portal 102 can receive and store venue identifiers and corresponding venue keywords in object database 107. Content portal 102 can receive content, associate corresponding target keywords with the received content, and store content and corresponding target keywords in content database 106.

Content providers can provide content to content portal 102. For example, content providers 104A and 104B can provide content 114A and 114B respectively to content portal 102. Content providers can indicate to content portal 102 that the content is to be associated with various target keywords. For example, content provider 104A can indicate that content 114A is to be associated with target keywords 144A. Similarly, content provider 104B can indicate that content 114B is to be associated with target keywords 144B. For example, if the content is related to a soft drink, target keys words may include types of food, locations where the software drink is bottled, names of athletic teams the brand sponsors, etc.

In some embodiments, content providers purchase different investment levels in target keywords. Content from content providers with higher investment levels in a target key word may be given priority over content for content providers with lower investment levels in the target keyword.

Figure 2:
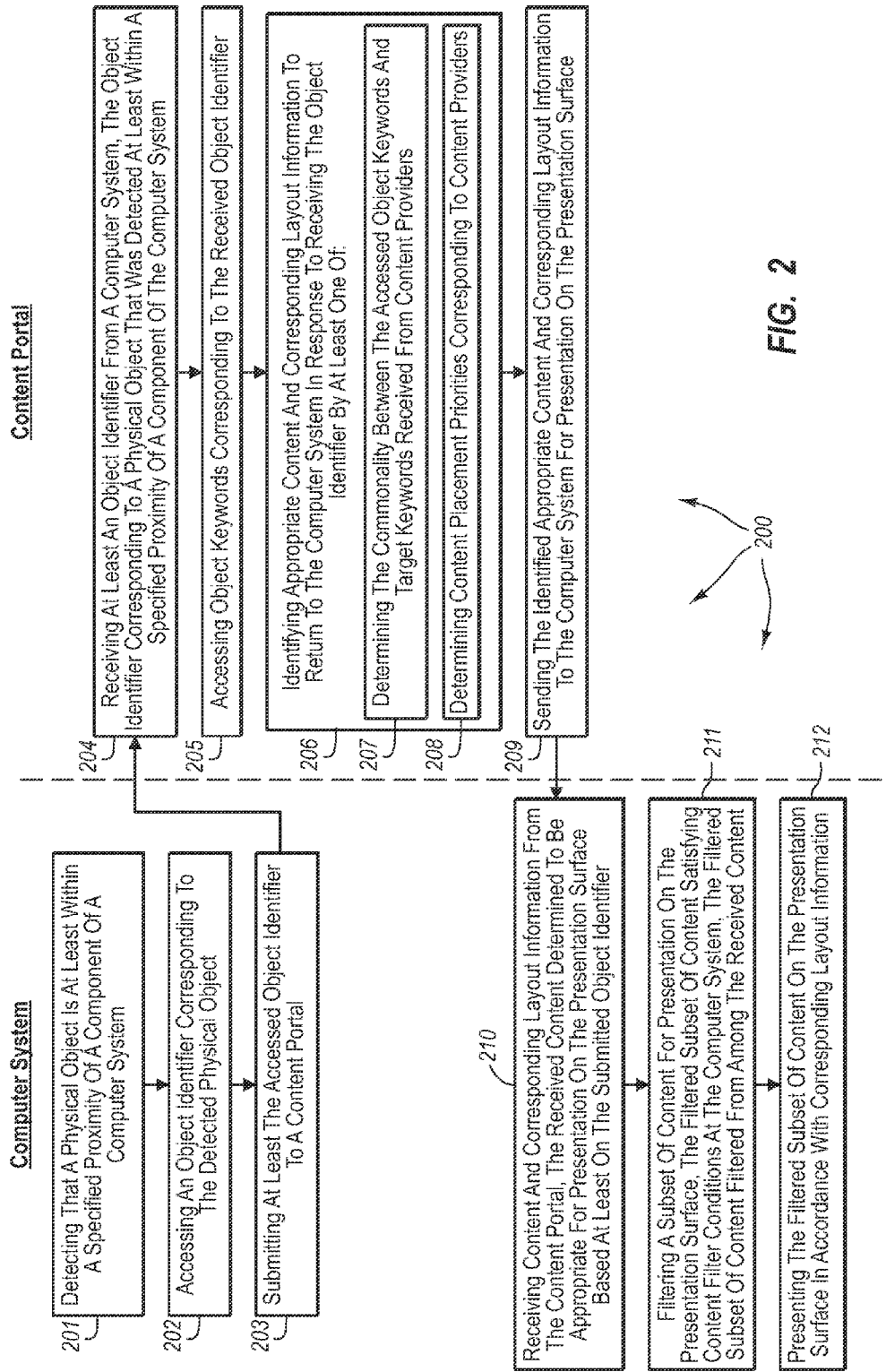
FIG. 2 illustrates a flowchart of a method for delivering content based on physical object characteristics.

FIG. 2 illustrates a flowchart of a method 200 for delivering content based on physical object characteristics. The method 200 will be described with respect to the components and data depicted in computer architecture 100.

Prior to requesting content from content portal 102 in response to detecting a physical object, table top computer system 121 can register with content portal 102. To register, table top computer system 121 can send registration data 124 to content portal 102. Registration data 124 can include venue ID 119 (a venue identifier for venue 101) and an electronic address (e.g., an Internet Protocol ("IP")) address for table top computer system 121. In response to registration data 124, content portal 102 can register table top computer system 121 to receive content relevant to detected physical objects in accordance with venue keywords 129 (venue keywords for venue 101). Content portal 102 can retain the registration information so that it can subsequently determine that the electronic address of table top computer system 121 corresponds to venue 119.

Method 200 includes an act of detecting that a physical object is at least within a specified proximity of a component of a computer system (act 201). Detection of a physical object at least within a specified proximity can include detecting that the physical object has come into physical contact with the presentation surface of the computer system. For example, user 109 can set tagged object 117 (e.g., a bottle) on the presentation surface (the table top) of table top computer system 121. Detection mechanism 143 can interoperate with a subset of sensors of table top computer system 121 to detect that tagged object 117 is in physical contact with the presentation surface. Detection mechanism 143 can also determine the location on the presentation surface where physical contact between tagged object 117 and the presentation surface is detected (e.g., near user 109).

Prior or subsequent to detection of tagged object 117, user 111 can set tagged object 118 (e.g., a glass) on the presentation surface (the table top) of table top computer system 121. Detection mechanism 143 can interoperate with a different subset of sensors of table top computer system 121 to detect that tagged object 118 is in physical contact with the presentation surface. Detection mechanism 143 can also determine the location on the presentation surface where physical contact between tagged object 118 and the presentation surface is detected (e.g., near user 111).

Thus, different physical objects coming into physical content with the presentation surface in different locations can be individually detected and differentiated from one another. Accordingly, different (yet appropriately tailored) content can be requested and presented for each detected object.

Method 200 includes an act of accessing an object identifier corresponding to the detected physical object (act 202). For example, detection mechanism 143 can interoperate with sensors of table top computer system to access tag ID 113 for tagged object 117. Accessing tag ID 113 can include reading tag ID 113 from tag 112. Alternately, through scanning and recognition techniques, detection mechanism 143 can access tag ID 113 from an appropriate list. Similarly (although not expressly depicted), tag ID 127 can be accessed for tagged object 118.

Method 200 includes an act of submitting at least the accessed object identifier to a content portal (act 203). For example, content service 122 can submit tag ID 113 to content portal 102. Alternately, content service 122 can submit tag ID 113 and venue ID 119 (a venue identifier for venue 101) to content portal 102. Similarly (although not expressly depicted), content service 122 can also submit tag ID 127 (with or without venue ID 119) to content portal 102.

Method 200 includes an act of receiving at least an object identifier from a computer system, the object identifier corresponding to a physical object that was detected at least within a specified proximity of a component of the computer system (act 204). In some embodiments, the object identifier indicates that the physical object has come into physical contact with a portion of a presentation surface at the computer system. In any event, content portal 102, for example, can receive tag ID 113 from table top computer system 121. When an object identifier is received, content portal 102 can associate the electronic (e.g., IP) address of a requesting computer system with its corresponding venue. For example, when tag ID 113 is received, content portal 102 can associate the electronic (e.g., IP) address of a table top computer system 121 with venue 101. Alternately, content portal 102 can receive tag ID 113 and venue ID 119 from table top computer system 121 such that separate identification of the venue 101 is not performed. Similarly, content portal 102 can also receive tag ID 127 (with or without venue ID 119) from table top computer system 121.

Method 200 includes an act of accessing object keywords corresponding to the received object identifier (act 205). For example, content portal 102 can access object keywords 126 corresponding to tag ID 113. Similarly, content portal 102 can access object keywords 128 corresponding to tag ID 127.

Method 200 includes an act of identifying appropriate content and corresponding layout information to return to the computer system in response to receiving the object identifier (act 206). For example, content portal 102 can identify content selections 126 (including content 114A and 114B) and corresponding layout information to return to table top computer system 121 in response to receiving tag ID 113. Similarly (although not expressly depicted), content portal 102 can identify appropriate content and corresponding layout information to return to table top computer system 121 in response to receiving tag ID 127. Layout information can include designated display characteristics of identified content.

Identifying appropriate content and corresponding layout information to return to the computer system in response to receiving the object identifier can include at least one of: an act of determining the commonality between the accessed object keywords and target keywords received from content providers (act 207) and an act of determining content placement priorities corresponding to content providers (act 208). For example, content portal 102 can determine the commonality between the accessed object keywords 126 and target keywords (target keywords 144A, 144B, etc.) in content database 106. Determining commonality can include a text comparison (e.g., character by character) of object keywords to target keywords. Alternately, or in combination, content portal 102 can also determine content placement priorities (e.g., investment level) corresponding to content providers 104A, 104B, etc.

In some embodiments, content portal 102 can also determine the commonality between venue keywords and target keywords received from content providers. For example, content portal 102 can determine the commonality between the venue keywords 129 and target keywords (target keywords 144A, 144B, etc.) in content database 106.

When there is sufficient commonality between object keywords and/or venue keywords and target keywords, content portal 102 can identify content corresponding to the target keywords as appropriate (e.g., relevant to tagged object 117). Likewise, when a content placement priority is sufficiently high, content portal 102 can identify content corresponding to a content provider as appropriate. In some embodiments, a combination of keyword commonality and placement priority is considered when identifying appropriate content.

Similar mechanisms can be used to identify appropriate content and layout information for tagged object 118 in response to receiving tag ID 127.

Identified content can include content that is a virtual representation of another physical object having some known association with the detected physical object. For example, if a can or bottle is detected on a presentation surface, identified content can include a virtual representation of a coaster for presentation under the can or bottle on the presentation surface. If a plate or bowl is detected, identified content can include a virtual represent of place mat.

Figure 3:
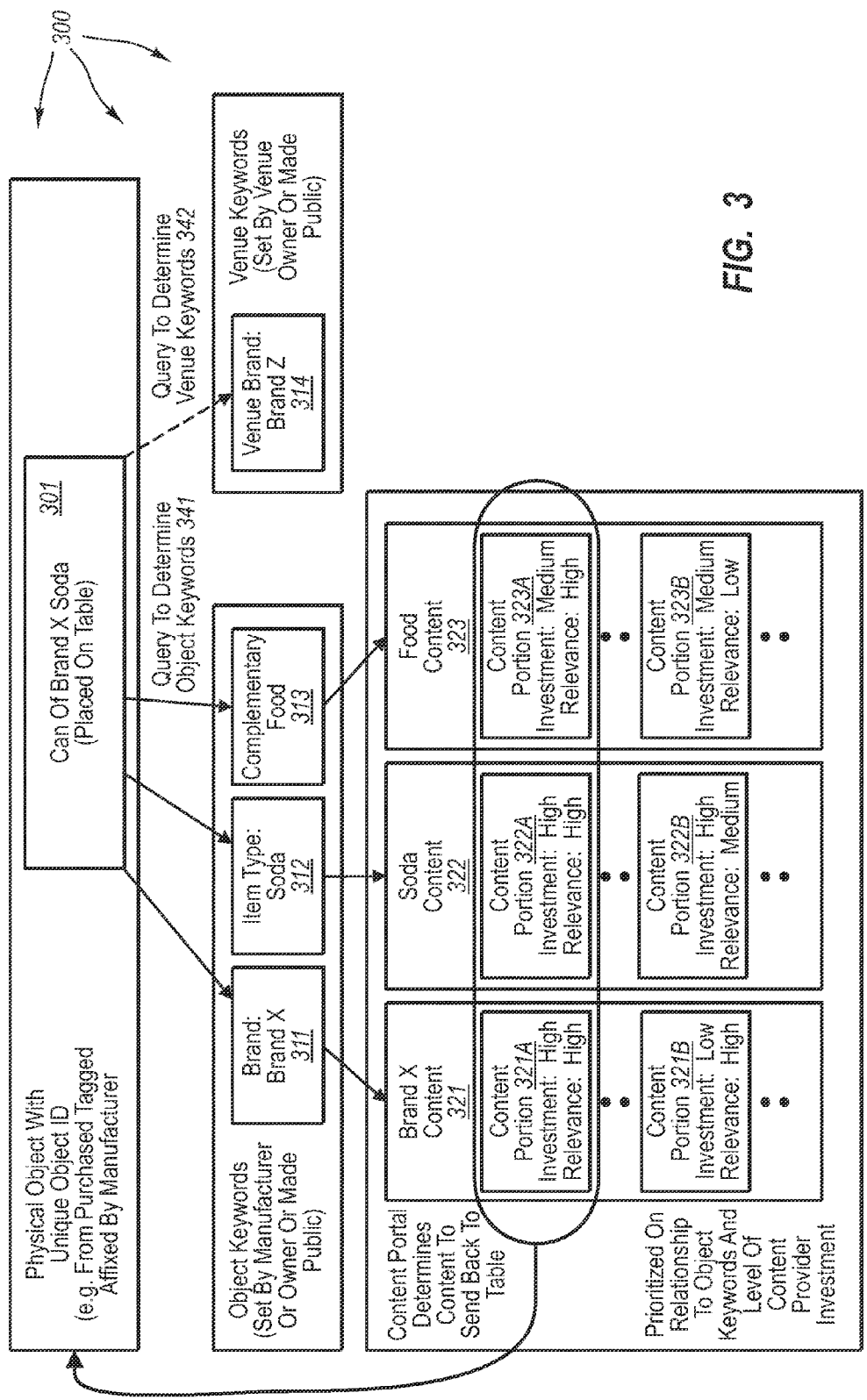
FIG. 3 illustrates a data flow for associating appropriate content with a detected physical object.

FIG. 3 illustrates a data flow 300 for associating appropriate content with a detected physical object. The data flow 300 can be executed at content portal 102 to associate appropriate content with a detected physical object, such as, for example, tagged object 117 or tagged object 118.

At block 301, a can of brand X soda can be detected as being placed on a table top. The can of brand X soda can have a unique object ID from a purchased tag that was subsequently affixed to the can. Query 341 can be issued to determine object keywords for the can of brand X soda. In response to query 341, at brand block 311 the keyword "Brand X" is returned, at item type block 312 the keyword "Soda" is returned, and at item complementary block 313 the keyword "Food" is returned. Object keywords can be set by the manufacturer or owner of the can of brand X soda or can be made public.

Query 342 can optionally be issued to determine venue keywords for the venue of the computer system that detected the can of brand X soda. In response to query 342 (if issued), at venue brand block 314 the keyword "Brand Z" (e.g., the name of a restaurant) is returned. Venue keywords can be set by the venue owner or made public.

At block 321 a plurality of portions of content associated with keyword "Brand X" are identified (321A, 321B, etc.). At block 322 a plurality of portions of content associated with keyword "Soda" are identified (322A, 322B, etc.). At block 323 a plurality of portions of content associated with keyword "Brand X" are identified (323A, 323B, etc.). Portions of content are prioritized on their relationship to the object keywords and level of content provider investment.

Portions of content for venue keywords and can be identified and prioritized similar to portions of content for object keywords. Thus, when appropriate, similar content can be returned for venue keywords.

Alternately, the relevance of retuned content can be determined from both venue keywords and object keywords. For example, if a portion of content has high relevance to both an object keyword and a venue keyword, the overall relevance can be indicated as higher than a portion of content that is relevant to only to an object keyword or a venue keyword.

Some number of portions of content can be returned to the table. In some embodiments, one or more portions of content with higher relevance and higher investment are returned for each object keyword or venue keyword or combination thereof.

Accordingly, referring briefly back to FIG. 1, it may be that content 114A and content 114B have a higher relevance to and/or a higher level of investment for tagged object 117 relative to other content in content database 106.

Transitioning again to FIG. 2, method 200 includes an act of sending the identified appropriate content and corresponding layout information to the computer system for presentation on the presentation surface (act 209). For example, content portal 102 can send content selections 126 (for tagged object 117 and including content 114A and 114B) along with corresponding layout information for presenting content sections 126 to table top computer system 121. Similarly (although not expressly depicted), content portal 102 can send content selections and layout information for tagged object 118. When an object is detected in physical contact with a presentation surface, content can be sent for display in proximity to the physically contacted portion of the presentation surface.

Method 200 includes an act of receiving content and corresponding layout information from the content portal, the received content determined to be appropriate for presentation on the presentation surface based at least on the submitted object identifier (act 210). For example, table top computer system 121 can receive content selections 126 (for tagged object 117) and corresponding layout information form content portal 102. Similarly (although not expressly depicted), table top computer system 121 can receive content selections and layout information for tagged object 118.

Method 200 includes an act of filtering a subset of content for presentation on the presentation surface, the filtered subset of content satisfying content filter conditions at the computer system, the filtered subset of content filtered from among the received content (act 211). For example, filter 123 can filter content subset 131 from content selections 126 (for tagged object 117). Filter 123 can filter content selections 126 in accordance with filter conditions of table top computer system 121. Similarly (although not expressly depicted), filter 123 can also filter a subset of any content selected for tagged object 118.

Figure 4:
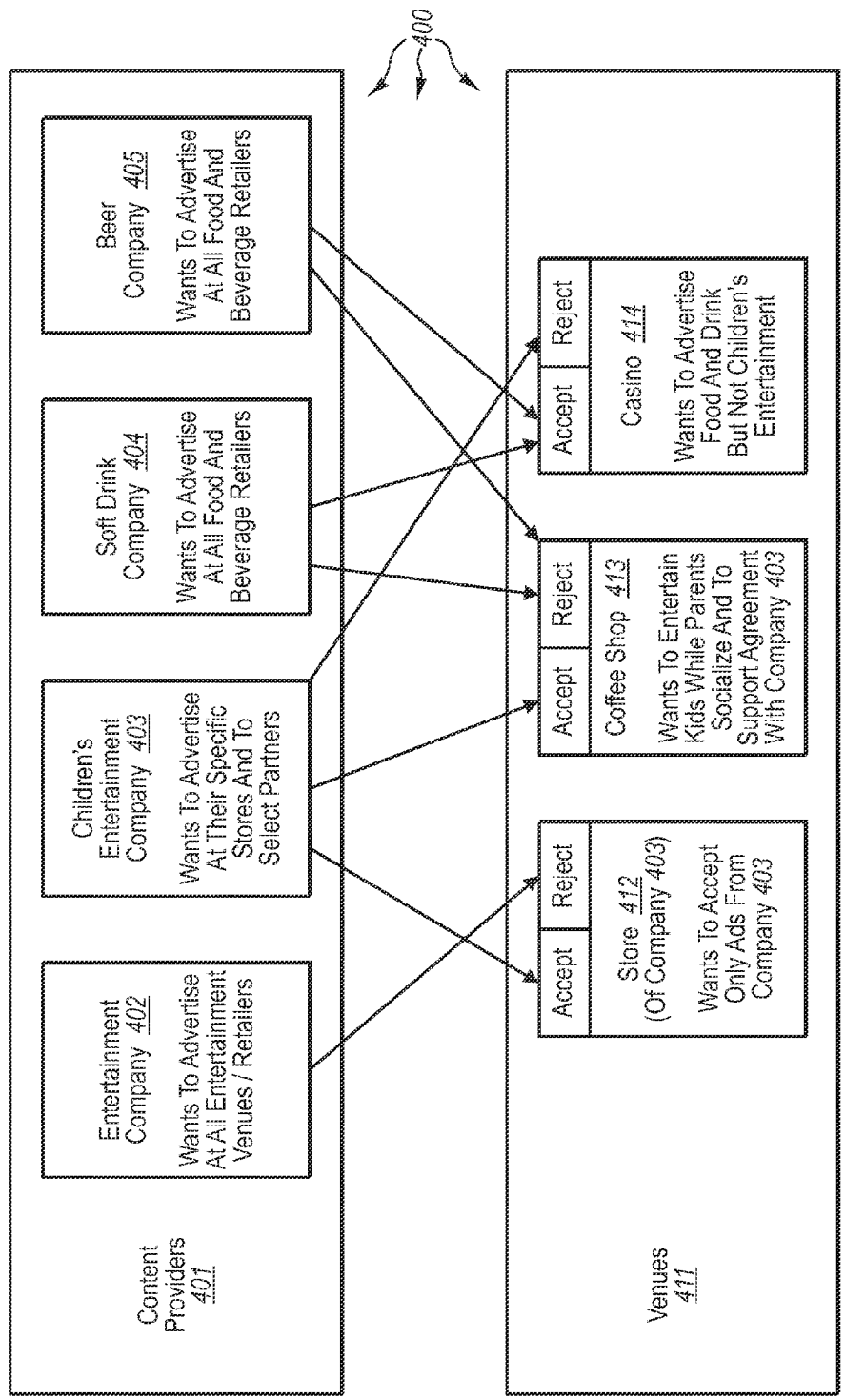
FIG. 4 illustrates a data flow of configured filter conditions for filtering received content at different venues.

FIG. 4 illustrates a data flow 400 of configured filter conditions for filtering received content at different venues. Filters can be of particular use to prevent unwanted content (e.g., from a competitor) even though the content has high relevance and/or investment as determined by a content portal. Data flow 400 indicates whether receive content is rejected or accepted at a venue. Arrows are depicted for content that has a relatively higher chance of being selected for a venue based on content provider investment.

As depicted, content providers 410 include entertainment company 402, children's company 403, soft drink company 404, and beer company 405. Entertainment company 402 has a desire to advertise in all entertainment venues and retail outlets. Accordingly, the entertainment company 402 can invest in keywords related to entertainment venues and retails outlets to increase their chances of having advertisements selected for presentation in those environments. Children's entertainment company 403 has a desire to advertise in their specific stores and with select partners. Accordingly, the children's entertainment company 403 can invest in keywords related to their stores and select partners to increase their chances of having advertisements selected for presentation in those environments.

Soft drink company 404 has a desire to advertise in all food and beverage retailers. Accordingly, soft drink company 404 can invest in keywords related to food and beverage retailers to increase their chances of having advertisements selected for presentation in those environments. Beer company 405 has a desire to advertise in all food and beverage retailers. Accordingly, Beer company 405 can invest in keywords related to food and beverage retailers to increase their chances of having advertisements selected for presentation in those environments.

Venues 411 include store 412 (of company 403), coffee shop 413, and casino 414. Store 412 has a desire to only accept advertisements from company 403. Thus, advertisements from company 403 are allowed for presentation. On the other hand, advertisements from entertainment company 402 are rejected.

Coffee shop 413 has a desire to entertain kids while parents socialize and to support its agreement with children's entertainment company 403. Thus, advertisements from children's entertainment company 403 are allowed for presentation. On the other hand, advertisements from soft drink company 404 and beer company 405 are rejected.

Casino 414 has a desire to advertise food and drink but not children's entertainment. Thus, advertisements from soft drink company 404 and beer company 405 are allowed. On the other hand, advertisements from children's entertainment company 403 are rejected.

Returning back to FIG. 2, method 200 includes presenting the filtered subset of content on the presentation surface in accordance with corresponding layout information (act 212). For example, table top computer system 121 can present content subset 131 on the presentation surface of table top computer system 121. When physical contact was detected, content subset 131 can be presented in proximity to the portion of the presentation surface where physical contact with tagged object 117 was detected. Similarly a content subset for tagged object 118 an be presented in proximity to the portion of the presentation surface where physical contact with tagged object 118 was detected.

Thus, different content can be presented in different locations on the presentation surface. For example, a separate subset of content can be presented for each object in physical contact with the presentation surface and/or for each user at the table top.

Figure 5B:
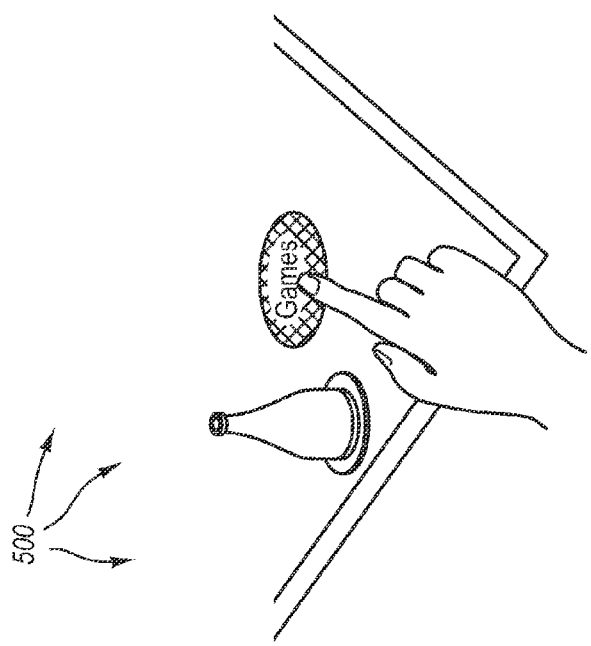
FIGS. 5A and 5B illustrate an example portion of a user-interface for interacting with presented content in proximity of detected physical objects.
Figure 5A:
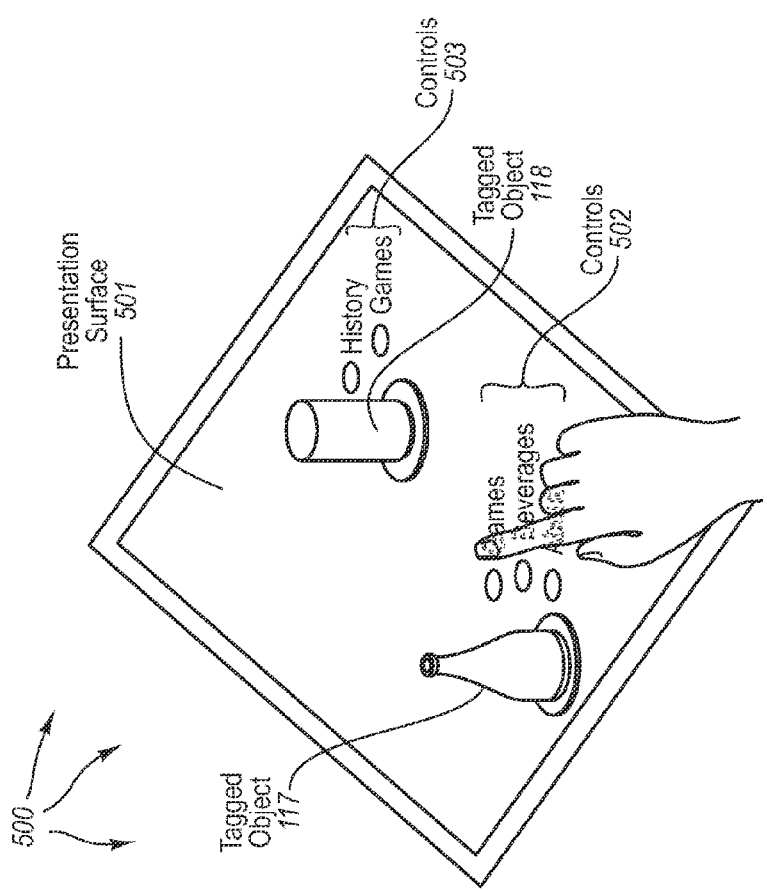

FIGS. 5A and 5B illustrate an example portion of a user-interface 500 for interacting with presented content in proximity of detected physical objects. User-interface 500 depicts controls 502 presented in proximity it tagged object 117 on presentation surface 501. Similarly, user-interface 500 depicts controls 503 presented in proximity it tagged object 118 on presentation surface 501. A user can interact with the controls to further explore or close the content. For example, in FIG. 5B, user-interface 500 depicts that the games control was selected.

After content is presented at a presentation surface, display statistics for the content can be returned to a content portal. For example, after presenting content subset 131, table top computer system 121 can return content presentation statistics 132 to content portal 102. Content presentation statistics 132 can indicate presentation duration, presentation size, level of interaction, etc., associated with content subset 131.

Content portal 102 can calculate a charge based per content provider based on content presentation statistics 132. Content portal 102 can then issue charges to the appropriate content providers. For example, Content portal 102 can issue charge 134 to content provider 104A. In response to charge 134, content provider 104A can submit funds 135 to content portal 102 to pay the charge. A portion of the funds 133, can be allocated back to venue 101.

Accordingly, embodiments of the present invention provides a way for product advertisers to dynamically position content for a consumer while the consumer interacts with a physical product in its physical form. That is, businesses can dynamically update and position interactive content (e.g., advertisements, games, etc.) around physical objects (e.g., products) in a way that is meaningful to users as they interact with the products. The interactive experience can be entirely user initiated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a presentation surface for presenting content, a method performed by the computer system for presenting content associated with a physical object detected on the computer system, the method comprising:

detecting by the computer system, via one or more sensors that a physical object has been placed on the presentation surface of the computer system, and detecting a portion of the surface where contact between the object and the presentation surface occurred, the presentation surface comprising an interactive multi-touch surface that provides a touch screen interface;

accessing an object identifier corresponding to the detected physical object;

submitting at least the accessed object identifier to a content portal;

receiving content and corresponding layout information from the content portal, the received content determined to be appropriate for presentation on the presentation surface based at least on the submitted object identifier;

filtering a subset of the received content for presentation on the presentation surface, the filtered subset of the received content satisfying content filter conditions at the computer system; and presenting the filtered subset of the received content on the presentation surface proximate the physical object, based at least in part on the detected portion of the surface where contact between the object and the presentation surface occurred and such that the filtered subset of the received content is presented in different locations on the presentation surface as contact between the object and presentation surface occurs at different corresponding locations of the presentation surface, the filtered subset of the received content also being presented in accordance with the corresponding layout information, the filtered subset of content including one or more controls that are user-selectable by touching the portion of the touch screen interface on which the one or more controls are presented.

2. The method at recited in claim 1, wherein the detecting comprises the one or more sensors, which are embedded in the presentation surface, detecting that the physical object has come into physical contact with the portion of the presentation surface.

3. The method as recited in claim 2, wherein the accessing an object identifier corresponding to the detected physical object comprises scanning, using the one or more embedded sensors, the portion of the object in physical contact with the presentation surface to determine an object type for the physical object.

4. The method as recited in claim 1, wherein the accessing an object identifier corresponding to the detected physical object comprises accessing the object identifier from a tag attached to the physical object.

5. The method as recited in claim 1, wherein the submitting at least the accessed object identifier to a content portal comprises submitting the accessed object identifier along with a venue identifies corresponding to the venue where the computer system is physically located.

6. The method as recited in claim 1, wherein the received content has associated target keywords with sufficient commonality to object keywords associated with the physical object.

7. The method as recited in claim 1, wherein the received content is associated with a placement priority.

8. The method as recited in claim 1, wherein die received content and corresponding layout information also corresponding to a second different physical object and is presented at a different location based on a determination that the second different physical object is positioned proximate the different location on the presentation surface.

9. The method as recited in claim 1, wherein the filtering comprises filtering the subset of the received content in accordance with at least one reject filter.

10. The method as recited in claim 1, wherein the object identifier defines a first brand that is associated with the object, the content includes advertisements for a different brand than the first brand, and filtering the subset of the received content comprises removing the advertisements for the different brand from the subset of the received content.

11. A computer system for displaying targeted content that is selected based on objects that are placed on top of the computer system, the computer system comprising:
    a presentation surface for presenting content, the presentation surface comprising an interactive multi-touch surface that provides a touch screen interface;
    one or more sensors, embedded within the computer system, that identify a physical object placed on the presentation surface by scanning an identifier tag on the portion of the physical object in contact with the presentation surface;
    one or more processors and memory storing computer executable instructions which, when executed by the one or more processors, perform the following acts to display content on the presentation surface in response to a physical object being placed on the surface:
        detecting that a physical object has been placed on the presentation surface of the computer system;
        detecting a portion of the surface of the computer system where the physical object has been placed;
        accessing an object identifier corresponding to the detected physical object;
        submitting at least the accessed object identifier to a content portal;
        receiving content and corresponding layout information from the content portal, the received content determined to be appropriate for presentation on the presentation surface based at least on the submitted object identifier;
        filtering a subset of the received content for presentation on the presentation surface, the filtered subset of the received content satisfying content filter conditions at the computer system; and
        presenting the filtered subset of the received content on the presentation surface proximate the physical object in accordance with the corresponding layout information, based at least in part on the detected portion of the surface and such that the filtered subset of content when presented at a different location on the presentation surface as the object is positioned proximate the different location on the presentation surface, the filtered subset of the received content including one or more controls that are user-selectable by touching a portion of the touch screen interface on which the one or more controls are presented.

12. The computer system of claim 11, wherein the computer executable instructions further perform:
    receiving user input at the portion of the touch screen interface on which one of the controls is presented, the user input comprising the selection of the control; and
    modifying the displayed filtered subset of received content in response to receiving the input.

13. The computer system of claim 12, wherein modifying the displayed filtered subset of received content comprises displaying additional information regarding the physical object placed on the presentation surface.

14. The computer system of claim 11, wherein the physical object is associated with a first brand, and wherein the filtering comprises removing one or more advertisement from the subset of received content that are associated with a second brand.

15. At a computer system including it presentation surface for presenting content, a method performed by the computer system for presenting content associated with a physical object detected on the computer system, the method comprising:
    detecting that a physical object has been placed on the presentation surface of the computer system, the presentation surface comprising an interactive multi-touch surface that provides a touch screen interface;
    detecting a location on the surface of the computer system where the physical object has been placed;
    accessing an object identifier corresponding to the detected physical object;
    submitting at least the accessed object identifier to a content portal;
    receiving content and corresponding layout information from the content portal, the received content determined to be appropriate for presentation on the presentation surface based at least on the submitted object identifier;
    filtering a subset of the received content for presentation on the presentation surface, the filtered subset of the received content satisfying content filter conditions at the computer system;
    presenting the filtered subset of the received content on the presentation surface proximate the physical object in accordance with the corresponding layout information, based at least in part on the detected location, such that the filtered subset of the received content is presented in different locations on the presentation surface as contact between the object and presentation surface occurs at different corresponding locations of the presentation surface, the filtered subset of content including one or more controls that are user-selectable by touching a portion of the touch screen interface on which the one or more controls are presented;
    receiving user input at the portion of the touch screen interface on which a particular control of the one or more controls is presented, the user input comprising a selection of the particular control; and
    modifying the displayed filtered subset of the received content in response to receiving the user input.

16. The method of claim 15, wherein the accessed object identifier identifies a type of the object, and the content comprises advertisements for products of a type similar to the identified type of object, and wherein the filtering comprises removing one or more advertisements from the subset of the received content for competitive products to the identified type of object.

* * * * *